March 13, 1956     A. H. HJEMBO     2,738,210
COUPLING DEVICE
Filed March 28, 1951

INVENTOR.
ALF H. HJEMBO
BY *Harry M. Saragovitz*
Attorney

United States Patent Office 2,738,210
Patented Mar. 13, 1956

2,738,210

COUPLING DEVICE

Alf H. Hjembo, Oceanport, N. J., assignor to the United States of America as represented by the Secretary of the Army Application March 28, 1951, Serial No. 218,056

3 Claims. (Cl. 287—130)

(Granted under Title 35, U. S. Code (1952), sec. 266)

The invention described herein may be manufactured and used by or for the Government for governmental purposes, without the payment of any royalty thereon.

This invention relates to an improved coupling device, and more particularly to a single-position precision rapid coupling device.

An object of this invention is to provide a precision rapid coupling device which may be operated simply and efficiently.

A further object is to provide a single position coupling device which may be locked into engagement by means of a member integral with the device.

Another object is to provide a high precision coupling device that will facilitate the assembly, disassembly and maintenance of radio or other equipment wherein it is utilized.

These and other objects of the invention will become apparent from the specification and claims that follow.

Although this invention has particular use in radio equipment where a quick disconnect between the main tuning dial and condenser is desired, extensive use of the disclosed coupling device in other fields is fully contemplated.

Figure 1:
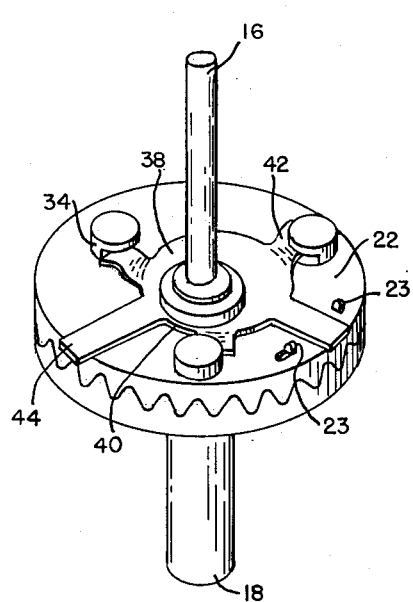
Figure 2:
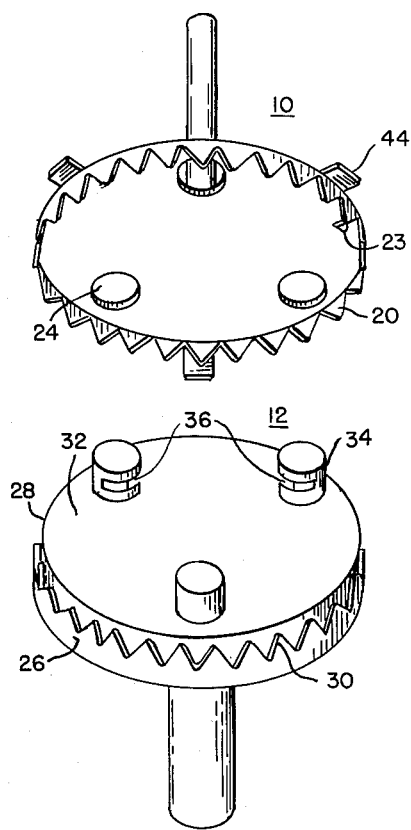

The invention will be more fully described with reference to the following drawings, wherein:

Fig. 1 is a perspective view of a coupling device in accordance with one embodiment of this invention showing the clutch members engaged; and Fig. 2 is a perspective view of the coupling device shown in Fig. 1 showing the clutch members disengaged.

Referring to the figures, the coupling device may be seen to comprise a pair of axially disposed clutch members 10 and 12, and a spring cam member 38. Clutch members 10 and 12 are shown mounted to rotatable shafts 16 and 18 respectively.

Clutch member 10 is cup-shaped and crown-toothed. The crown teeth 20 of clutch member 10 extend outwardly from the member base 22 and three apertures 24 are non-symmetrically disposed in base 22. Outwardly extending angularly spaced catches 23 are provided on base 22 for a reason to be disclosed hereinafter.

Clutch member 12 is disk-shaped and is shown to comprise a cup-shaped crown-toothed element 26 having a disk 28 contained tightly therein. The teeth 30 of element 26 are complementary to the teeth 20 of clutch member 10. Extending outwardly from face 32 of disk 28 are three studs 34. Studs 34 are positioned complementary to the apertures 24 in clutch member 10 and have indentations 36 in their distal ends. The studs 34 are of equal and sufficient length to support the base 22 of clutch member 10 and to allow member 10 to rotate freely about disk 28 of clutch member 12 until apertures 24 and studs 34 mate. When the mating occurs, teeth 20 and 30 may be engaged.

Spring cam member 38 comprises an axially mounted spring steel plate 40 rotatably mounted on the outer surface of base 22 of clutch member 10. Cam member 38 has raised tabs 42 and fingers 44 extending radially from its perimeter.

When clutch members 10 and 12 are engaged, studs 34 are mated within apertures 24, as are clutch teeth 20 and 30 (see Fig. 1). The clutch members may be locked into engagement by rotating spring cam member 38 clockwise until tabs 42 are frictionally engaged within indentations 36 and a finger 44 rests against a catch 23. To unlock the clutch members this same finger 44 and, therefore, cam member 38 may be rotated counterclockwise until the finger 44 rests against the remaining catch 23.

The non-symmetrical positioning of complementary apertures 24 and studs 34 insures the coupling of clutch members 10 and 12 in one phase position only. It is advantageous to use three studs and three apertures to prevent wobbling of the clutch members when they are being engaged. Precision coupling of clutch members 10 and 12 is attained through the engagement of teeth 20 and 30. Apertures 24, studs 34 and disk 28 act merely as guides to facilitate the rapid coupling of clutch members 10 and 12. Apertures 24 have a larger diameter than studs 34, since a snug fit is desirable.

The cup-shaped clutch member, or the cup-shaped element of the herein disclosed device may be made of sheet metal stamping. Other parts of the disclosed device may be made and joined by methods well known to the art. Such methods will not be discussed herein, since they form no part of this invention.

As many apparently widely different embodiments of the invention may be made without departing from the spirit and scope hereof, it is to be understood that the invention is not limited to its specific embodiments except as defined in the appended claims.

What is claimed is:

1. In combination, first and second axially disposed clutch members, said first clutch member being cup-shaped and crown-shaped, at least three studs, non-symmetrically positioned on the face of said first clutch member and extending perpendicularly therefrom in a direction toward said second clutch member, said studs having indentations therein near the distal end thereof, said second clutch member being cup-shaped and crown-toothed in engagement with the crown teeth of said first clutch member and having three openings respectively positioned in alignment with said studs and through and beyond which said studs extend, and a spring cam means comprising an axially positioned spring steel plate rotatably mounted on the outer surface of the base of said second clutch member and having at least three non-symmetrical raised tabs extending radially from the periphery thereof and being positioned complementary to the position of said studs and said openings which engage the indentations in the respective complementary studs.

2. The combination defined by claim 1, wherein said first clutch member includes a disk fittably engaged within the cup-portion thereof for sustaining the studs which extend into the openings in said second clutch member.

3. In combination, a pair of axially disposed clutch members, one of said members being cup-shaped and having crown-teeth about the periphery thereof, the other of said members being disk-shaped and having crown-teeth about the periphery thereof, complementary to and in engagement with the crown-teeth of said one member, said cup-shaped member having at least two non-symmetrically positioned openings in the crown thereof, said disk-shaped member having at least two studs which extend perpendicularly from the face of the disk portion in a direction toward said cup-shaped clutch member and positioned complementary to said openings which engage with said openings, and a spring cam member axially aligned with and coupled to said cup-shaped member, said spring cam member comprising an axially positioned spring steel plate rotatably mounted on the outer surface of the base of said cup-shaped member and having at least two raised tabs extending radially from the periphery thereof and positioned with respect to each other complementary to the position of said openings and said studs which engage notches in the ends of said studs.

References Cited in the file of this patent

UNITED STATES PATENTS

| | | |
|---|---|---|
| 59,160 | Babcock | Oct. 30, 1866 |
| 262,553 | Allen | Aug. 15, 1882 |
| 707,357 | Rudd | Aug. 19, 1902 |
| 734,880 | Jorgensen | July 28, 1903 |
| 877,113 | Owens | Jan. 21, 1908 |
| 1,301,160 | Noble | Apr. 22, 1919 |
| 1,715,293 | Hubbard | May 28, 1929 |
| 2,206,223 | Dearborn | July 2, 1940 |
| 2,494,639 | Yates | Jan. 17, 1950 |